United States Patent [19]

Henderson

[11] Patent Number: 4,828,140

[45] Date of Patent: May 9, 1989

[54] LID FOR COOKING UTENSILS

[76] Inventor: Henning M. Henderson, 2 Club View, Corner Nigel & Hills Roads, Selection Park, Springs, Transvaal Province, South Africa

[21] Appl. No.: 132,265

[22] Filed: Dec. 14, 1987

[30] Foreign Application Priority Data

Dec. 29, 1986 [ZA] South Africa ............... 86/9711
Feb. 5, 1987 [ZA] South Africa ............... 87/0838

[51] Int. Cl.⁴ ............................................. B65D 51/16
[52] U.S. Cl. ......................................... 220/369; 220/373; 220/287
[58] Field of Search .............. 220/369, 205, 287, 367, 220/373

[56] References Cited

U.S. PATENT DOCUMENTS

| 534,138 | 2/1895 | Cleary | 220/369 X |
| 616,883 | 1/1899 | Bowers | 220/369 |
| 626,808 | 6/1899 | Gurney | 220/369 |
| 1,149,289 | 8/1915 | Post et al. | 220/367 X |
| 2,510,196 | 6/1950 | Willette | 220/373 X |
| 2,636,636 | 4/1953 | Smith | 220/369 |
| 2,702,143 | 2/1955 | Williamson | 220/369 |
| 2,907,467 | 10/1959 | Machate, Jr. | 220/287 X |
| 3,598,105 | 8/1971 | Cristaldi | 220/369 X |
| 3,827,596 | 8/1974 | Powers, Jr. | 220/367 X |
| 4,482,077 | 11/1984 | Henderson | 220/367 X |

Primary Examiner—Steven M. Pollard
Attorney, Agent, or Firm—Stevens, Davis, Miller & Mosher

[57] ABSTRACT

A lid for cooking utensils such as a frying pan, pot, or the like is provided in which the lid has a dished configuration, generally smoothly dished towards a central region such that the lid may be accommodated on a wide variety of different pots and pans. The lid has perforations in the operatively lowermost region thereof to allow liquids thereon to drain into a pot or pan in use. Associated with each perforation is a shield member located thereover so that direct passage of liquids or solids through the perforations is substantially prevented while passage of gasses is free. There may be only one shield member for all the perforations and a centrally located handle is generally provided.

10 Claims, 1 Drawing Sheet

LID FOR COOKING UTENSILS

FIELD OF THE INVENTION

This invention relates to a lid for a cooking utensil such as a pot, frying pan, roasting pan or the like and, more particularly, the invention relates to a lid having perforations therethrough to allow for the escape of steam and other gaseous products while being designed to substantially maintain liquids within the cooking utensil during use.

BACKGROUND TO THE INVENTION

Numerous different shapes and configurations of perforated lids for cooking utensils have been proposed and manufactured. Many of these operate effectively to greater or lesser extents and, in particular, a cooking lid patented by myself under South African Patent No. 83/8628 has proved to be highly successful in use.

Many of the more effective perforated lids of this nature are composed of two shell elements which are often fixed in relationship to each other but, in some cases, such as in the case of my earlier patent, are releasably held together.

A construction such as this is costly in view of the fact that two complete shell members are required particularly since stainless steel, which is costly, is the preferred material of manufacture.

It is the object of this invention to provide a simplified and therefore less costly lid for cooking utensils which will operate effectively in use.

SUMMARY OF THE INVENTION

In accordance with this invention there is provided a lid for cooking utensils comprising a single lid member having a dish configuration such that, in the operative orientation, a central zone thereof is lower than the remainder of the lid, perforations through the lid member in said central zone, and at least one shield member spaced upwardly from said perforations and supported relative to the lid member by one or more stand members, the shield members being adapted to substantially shield the perforations in use from direct passage of liquids out of the perforations while allowing the free escape of gas past such shield members.

Further features of the invention provide for the lid member to be smoothly dished towards a central zone in which a plurality of perforations encircle the centre of the lid; for the centre of the lid to have an attachment of a single upwardly extending stand member supporting a single disc-like shield member at a distance spaced apart from the lid member and for the uppermost end of the stand member to be fitted with a handle whereby the lid can be manipulated.

Conveniently the stand member is releasably held in a screw-threaded socket welded or otherwise permanently secured to the centre of the lid member and the perforations are formed to define, in an operative condition, somewhat downwardly extending, short, truncated conical portions. Alternatively, the perforations may be formed by forming short cuts and pressing the material on opposite sides of the cuts in opposite directions to form holes lying in planes substantially at right angles to the plane of the lid.

Preferably the lid member has a peripheral upwardly extending wall section and outwardly extending flange section, the ultimage edge of which can conveniently be rolled over. The lid member is conveniently pressed from a suitable metal sheet and, in particular, stainless steel.

One embodiment of the invention will now be described by way of example.

DETAILED DESCRIPTION WITH REFERENCE TO THE DRAWINGS

Figure 1:
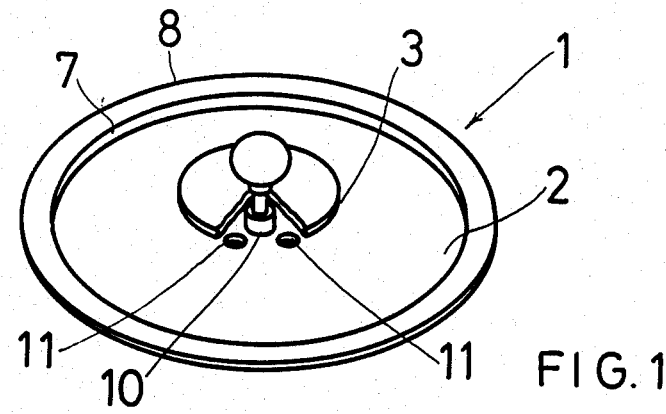
FIG. 1—is an isometric view of a lid according to this invention.
Figure 2:
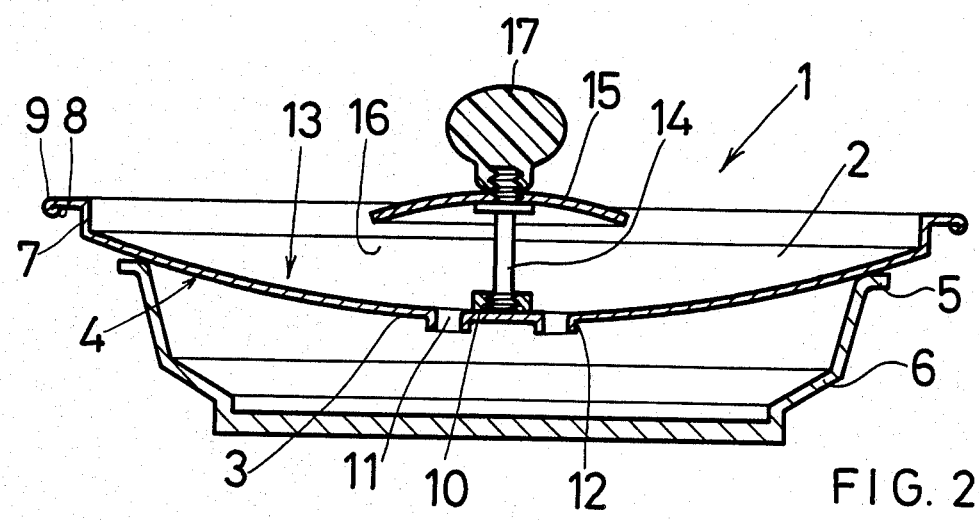
FIG. 2—is a cross-sectinal elevation thereof illustrating the lid in operation on a frying pan.

In the embodiment of the invention illustrated in FIGS. 1 and 2, a cooking lid, generally indicated by numeral 1, comprises basically a single lid member 2 made of pressed metal sheet material, most conveniently, and preferably, stainless steel.

The lid member 2 is made to a shallow dished shape such that the central region 3 is lowermost in use.

The lid is of conventional circular shape and, the dished configuration therefore enables the lid to be placed upon a cooking utensil of any diameter less than its own diameter with the undersurface 4 of the lid member in engagement with the periphery 5 of such cooking utensil 6.

The outermost periphery of the lid member has an upstanding wall section 7 and an outwardly directed flange 8 terminating in a rolled over edge 9.

The centre of the lid member has permanently secured thereto, for instance by welding, a socket defining member 10 and a plurality of perforations 11 surrounding the member 10. Each of the perforations is formed by punching a hole in the sheet material and the punching is effected such that a short truncated conical or like section 12 communicates between the dished lid shape and the ultimate perforation 11. The perforation is thus somewhat below the adjacent surface of the lid member in the operative position.

The latter configuration enables liquids, which may accumulate on the upper surface 13 of the lid member, to flow downwardly towards the perforations 11 and thence back into the cooking utensil. The perforations 11 thus serve the function of both allowing gasses to flow out of the cooking utensil while allowing liquids accumulating on the upper surface of the lid to flow back into the utensil.

The socket 10 receives, in releasable manner, a stand member in the form of an upstanding stud 14 which supports, at its upper end, a shield member 15 which is positioned in spaced relationship to the opposite surface of the lid member and serves to shield the perforations 11 in a manner such that any direct path for liquids or solids tending to spatter out through the perforations 11 is obscured. A large space 16 remains between the periphery of the shield member 15 and the adjacent surface of the lid member for the passage of such gasses and, preferably, the space 16 is made sufficiently large to facilitate cleaning without removing the stud 14.

The operatively upper end of the stud is fitted with a handle 17 whereby the lid can be manipulated in use.

It will be understood that the above construction of a cooking lid is substantially less costly than one in which two complete shell members are releasably or permanently secured together. In spite of this the cooking lid will be highly effective in use.

Numerous variations may be made to the above described embodiment of the invention without departing from the scope hereof. In particular the shield member 15 need not be of a single construction and each perforation 11 could be provided with its own shield member carried by a suitable stand. One stand could be used for all the shield members or each shield member could be carried on its own stand member or stud.

Figure 3:
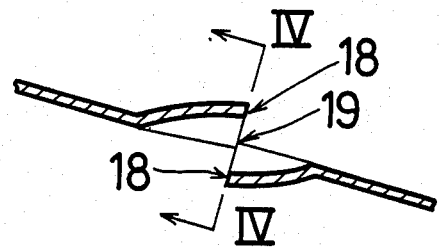
FIG. 3—is a sectional elevation of an alternative form of hole through the lid.
Figure 4:
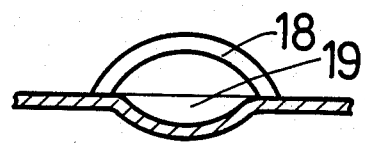
FIG. 4—is a view taken along line IV—IV in FIG. 3.

The configuration of the holes 11 may also be changed to that illustrated in FIGS. 3 and 4. In this case a short cut is made in the lid and the two edges 18 are bent away from each other in opposite directions to provide a hole 19 located in a plane at substantially right angles to the adjacent surface of the lid. This arrangement renders it less likely that material can spatter out through the holes.

The invention therefore provides a simple yet highly effective cooking lid which, it is envisaged, will be capable of being manufactured at appreciably lesser cost than certain prior art cooking lids.

What I claim as new and desire to secure by Letters Patent is:

1. A lid for cooking utensils comprising a single lid member having a smoothly dished configuration such that, in the operative orientation, a central zone thereof is lower than the remainder of the lid, perforations through the lid member and confined in location to said lower central zone, and an imperforate shield member of substantially smaller size than the lid itself, the shield member being spaced upwardly from said perforations and being supported relative to the lid member by one or more stand members, the shield member being adapted to substantially shield the perforations in use from direct passage of liquids out of the perforations while allowing the free escape of gas past such shield members.

2. A lid as claimed in claim 1 in which the lid member has a peripheral upwardly extending wall section and outwardly extending flange section, the ultimate edge of which is rolled over.

3. A lid as claimed in claim 1 in which a plurality of perforations encircle the centre of the lid.

4. A lid as claimed in claim 1 in which the centre of the lid has an attachment for a single upwardly extending stand member supporting a single disc-like shield member at a distance spaced apart from the lid member.

5. A lid as claimed in claim 4 in which the stand member is releasably held in a screw-threaded socket welded or otherwise permanently secured to the centre of the lid member.

6. A lid as claimed in claim 1 in which the uppermost end of the stand member is fitted with a handle whereby the lid can be manipulated.

7. A lid as claimed in claim 1 in which the perforations are formed to define, in an operative condition, somewhat downwardly extending, short truncated conical portions.

8. A lid as claimed in claim 1 in which the perforations are formed by forming short cuts and pressing the material on opposite sides of the cuts in opposite directions to form holes lying in planes substantially at right angles to the plane of the lid.

9. A lid as claimed in claim 1 in which the lid member is pressed from a suitable metal sheet.

10. A lid as claimed in claim 9 in which the lid member is pressed from stainless steel.

* * * * *